July 27, 1926.

S. B. REDFIELD

PLATE VALVE

Filed Jan. 9, 1926

1,593,914

INVENTOR
Snowden B. Redfield
BY
Herbert G. Ogden
HIS ATTORNEY

Patented July 27, 1926.

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

PLATE VALVE.

Application filed January 9, 1926. Serial No. 80,301.

This invention relates to valves for air compressors but more particularly to an improvement in the type of valve known to the art as a plate valve. Heretofore, the valve disc or plate in these valves has either been guided by means of flexible arms anchored to the valve bolt and attached to the valve disc in some manner, or else the valve plate or disc has been designed to lie in grooves cut in the valve seat itself with or without guide pieces or dowel pins. There are certain disadvantages to all of these methods, with resultant leakage and breakage of the valve when it is put into operation, and my invention aims to eliminate these disadvantages by providing a plate valve in which the valve disc is guided by means of small clips and springs preferably interposed between the valve plate and the stop plate.

The object of my invention, therefore, is to provide a plate valve in which the flexible guide plate is eliminated, while other objects of my invention are to provide a valve in which the assembly is extremely simple, leakage is eliminated by the quick and exact seating of the valve when put into operation, and breakage is prevented by dispensing with the heretofore vulnerable features in the plate valve assembly, such as rivets, welds and the like.

My invention consists of the combination of elements and features of novelty, set forth in the appended claims, described in the specification and illustrated in the drawings, in which—

Figure 3:
Figure 3 is a perspective view of the valve clip which is the main element in my invention.
Figure 4:
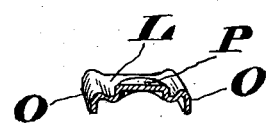
Figure 4 is a perspective view partly in section of this clip.
Figure 2:
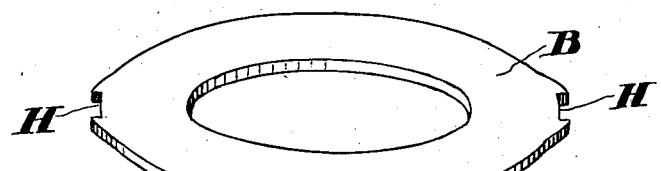
Figure 2 is a perspective view of the valve disc or plate.
Figure 1:
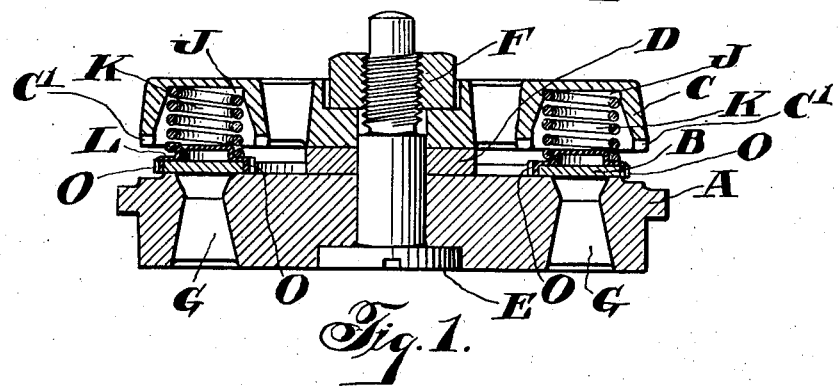
Figure 1 is an elevation in section of the complete valve assembly.

Referring to the drawings the usual valve assembly is shown in Figure 1 with the valve seat A, an annular valve plate or disc B, a stop plate C and a washer D, the whole being held together by any suitable means, as for instance, a stud or bolt E and the nut F. The annular valve disc is in the form of a flat ring adapted to lie over the ports G in the valve seat A. Notches H, of any suitable number, are cut in the valve disc B, preferaby on the outside circumference thereof. Pockets J are formed in the stop plate C to receive coil springs K. Valve clips L seated on the disc B preferably consists of small plates with ears or tongues O formed at an angle to the clips to fit into the notches H in the valve disc B. The notches H are preferably of rectangular shape as illustrated, although said notches may be of any other suitable shape, as for instance, semi-circular, it being understood, of course, that in such case, the ears or tongues O be shaped to conform therewith.

A spring seat or seats P consisting of cylindrical portions preferably raised on the clip, or, if desired, depressions, may be formed on the said clip. The clips L are thus adapted to fit over the valve disc D, the tongues or ears O having engagement with the notches H in the valve disc B. Likewise, the coil springs K located in the pockets J are adapted to engage the spring seat P on the clips L. A dowel pin through the valve seat A, stop plate C and washer D, and not shown in the drawing, may be used in order to insure the valve disc B being returned to its relative position on the valve seat. Recesses C' are in this instance formed in the inner face of the stop plate C to prevent contact between the clips L and the stop plate when the valve disc is raised from the valve seat A.

In the operation of the device, the springs K bearing upon the clip L with a predetermined pressure, indirectly bear upon the valve plate B and hold it to its seat. When pressure in the compressor cylinder is sufficient to overcome the pressure of the springs K the valve plate B is lifted off its seat, and when the cylinder pressure decreases, the valve disc returns to its seat. The engagement of the clips L with the notches H in the valve disc prevent lateral movement of the valve disc. This insures the wearing of a so-called "seat" between the valve disc and the valve seat and eliminates leakage due to minute aberrations in the contact surfaces between the valve disc and the valve seat.

The drawings and this specification confine themselves to a plate valve for use as a discharge valve and also for use with a small compressor. There is no reason, however, why my invention cannot be applied to large plate valves in which there are two or more concentric circular valve ports and in which annular plates or valve discs and a proportionate number of springs and clips may be used. In like manner the invention as described and claimed can be applied to an inlet valve, the only necessary changes in the conversion of the discharge valve hereinbefore described to an inlet valve being the adaptation of the valve seat for reversal in the cylinder seat, and the use of coil springs K with preferably a small initial tension.

I claim:

1. An improvement in plate valves for air compressors comprising a valve seat, a stop plate having pockets, a valve disc with notches cut on its circumference, clips with ears or tongues adapted to engage the notches for preventing movement of the clips with respect to the valve disc, coil springs in the said pockets of the stop plate for returning and holding the valve disc to the valve seat and spring seats on the said clips for engagement with the said coil springs.

2. An improvement in plate valves for air compressors comprising a valve seat having circular ports, a valve disc adapted to lie over and upon the ports in the said valve plate, notches in the circumference of the said valve disc, clips having ears or tongues for engagement with the said notches to prevent relative movement between said clips and the valve disc, spring seats on the said clips, a stop plate, pockets in said stop plate, and coil springs in said pockets, said springs being adapted to engage the spring seats for pressing the clips downwardly upon the valve disc, and for preventing lateral movement of the valve disc with respect to the valve seat.

In testimony whereof I have signed this specification.

SNOWDEN B. REDFIELD.